(12) United States Patent
Hansquine et al.

(10) Patent No.: US 6,493,354 B1
(45) Date of Patent: Dec. 10, 2002

(54) RESOURCE ALLOCATOR

(75) Inventors: David Hansquine, San Diego, CA (US); Avneesh Agrawal, Sunnyvale, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/189,710

(22) Filed: Nov. 11, 1998

(51) Int. Cl.[7] .............................. H04J 3/16; H04J 3/02; G06F 15/173
(52) U.S. Cl. ..................... 370/468; 370/537; 709/226
(58) Field of Search ................... 370/412, 413, 370/414, 415, 468, 428, 535, 388, 398, 465, 537, 538; 709/226, 203, 232, 233, 224, 223, 104, 219; 710/244

(56) References Cited

U.S. PATENT DOCUMENTS

| | | | | |
|---|---|---|---|---|
| 5,381,403 A | * | 1/1995 | Maher et al. | 370/254 |
| 5,574,911 A | * | 11/1996 | D'Angle et al. | 707/1 |
| 5,931,924 A | * | 8/1999 | Arimilli et al. | 710/41 |
| 5,935,234 A | * | 8/1999 | Arimilli et al. | 710/244 |
| 5,996,013 A | * | 11/1999 | Delp et al. | 709/226 |
| 6,058,423 A | * | 5/2000 | Factor | 709/226 |
| 6,072,906 A | * | 6/2000 | Sato | 382/237 |
| 6,104,962 A | * | 8/2000 | Sastry | 700/86 |
| 6,112,243 A | * | 8/2000 | Downs et al. | 709/226 |
| 6,188,686 B1 | * | 2/2001 | Smith | 370/388 |
| 6,301,616 B1 | * | 10/2001 | Pal et al. | 709/226 |

FOREIGN PATENT DOCUMENTS

| | | |
|---|---|---|
| EP | 0 344 712 A2 | 12/1989 |
| EP | 0 394 173 A2 | 10/1990 |

OTHER PUBLICATIONS

Patent Abstracts of Japan, vol. 12, No. 363 (P–764) (Sep. 29, 1988) / JP 63–113637 to Fujitsu Ltd. (May 18, 1988).

* cited by examiner

*Primary Examiner*—Kwang Bin Yao
*Assistant Examiner*—Hanh Nguyen
(74) *Attorney, Agent, or Firm*—Philip R. Wadsworth; Charles D. Brown; Howard H. Seo

(57) ABSTRACT

A resource allocator for allocating at least two different types of hardware resources for users within a communication system, wherein the system supports up to a first predetermined number of users of one particular type and a second predetermined number of users of a second particular type. The resource allocator provides a mapping of resources, either from fixed resources to shared resources or from shared resources to fixed resources, which is both cost effective and transparent to software.

9 Claims, 3 Drawing Sheets

RESOURCE ALLOCATOR

BACKGROUND OF THE INVENTION

1. Field of the Invention

The present invention relates to a resource allocator for allocating a predetermined number of hardware resources from among a plurality of hardware resource types within a communication system.

2. Description of Related Art

When designing a system to support a predetermined number of total users of more than one type, wherein different hardware is required for at least one type of user and the system can support at most a specific number of users of a first type and a remaining number of users of other types. One solution to the problem is to require the system to support the same number of users of each type. However, this is a costly alternative because separate hardware needs to be used for each type of user.

For example, in a system which can support eight type 1 users, which require type 1 hardware, and twelve type 2 users, which require type 2 hardware, and a total number of 12 users, hardware could be provided to support twelve users of both types 1 and 2. This solution requires twelve of type 1 hardware and twelve of type 2 hardware, or a total of twenty-four units of hardware. However, this is somewhat wasteful because there will always be at least four type 1 users that cannot be supported.

SUMMARY OF THE INVENTION

It is an object of the present invention to provide a hardware and software based solution to the above-mentioned problem which is more efficient, cost effective and shields software from the mapping details.

In order to achieve this, the present invention allows up to a given number of total users, for example, 12, wherein up to eight users require, for example RSOLD type hardware, and a remaining number of users require, for example, RSNEW type hardware. This is accomplished by mapping, for example, twelve shared resources into, for example, twelve fixed resources via two tables, one table having twelve entries, corresponding to a maximum number of total users, and another table having eight entries, corresponding to the eight units of RSOLD type hardware.

DETAILED DESCRIPTION OF THE PREFERRED EMBODIMENTS

The present invention is a resource or channel allocator for allocating hardware resources or channels for a predetermined number of users in a communication system. A plurality of communication standards may be used within the communication system. However, it is possible that one standard may be less efficient than other standards. For example, a new standard provides additional capacity over a previous standard. In other words, a larger number of users of the new standard can be supported over a given bandwidth than was possible for users of the old standard. The old standard requires hardware that supports older ratesets. For the purposes of this application, this hardware is referred to as RSOLD hardware. The new standard requires hardware that supports new ratesets. For the purposes of this application, this hardware is referred to as RSNEW hardware.

In the preferred embodiment, a total number of, for example, twelve users may be allocated resources at one time. Because the old standard is less efficient, no more than, for example, eight users may be users of the old standard. Each of the twelve users will be assigned to either one of the eight RSOLD hardware elements or one of the twelve RSNEW hardware elements.

Software is programmed for twelve users (0 through 11) and does not keep track of which hardware element is allocated for each user. Hardware provides a mapping of hardware resources for each user, such that the hardware provides a transparent interface to the software. When accessing a hardware resource, the software provides a channel element or user number in an address field and the hardware will perform the required mapping to the proper hardware element.

The resource channel allocator performs mapping between fixed resources and shared resources. Fixed and shared resources are defined as follows:

A. RSOLD fixed resources, which are the old hardware that only supports the old ratesets;

B. RSNEW fixed resources, which are the new hardware that only supports the new ratesets; and C. RSBOTH shared resources, which are the new hardware that supports both the old and the new ratesets.

Figure 1:
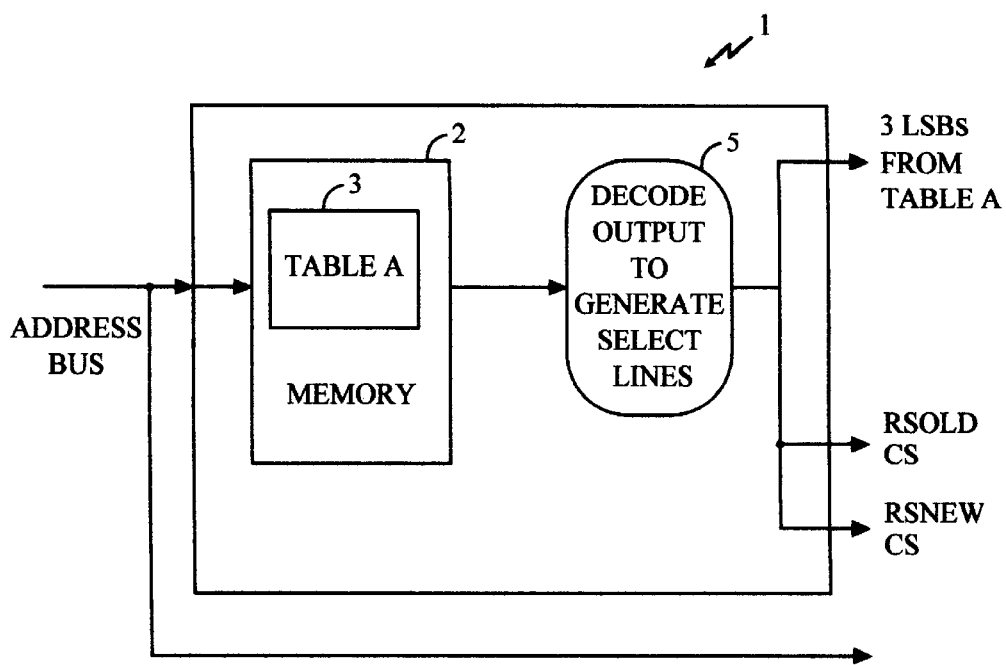
FIG. 1 shows an example of a resource allocator mapping a software access to hardware elements.

FIG. 1 provides an illustration of software accessing the hardware elements. Reference numeral 1 refers to the resource channel allocator 1. An address is provided on an address bus to the resource channel allocator 1. Software accesses use "RSNEW CS" and four address lines to select which of the twelve hardware elements of either resources B or C, as defined above, to access. Software accesses use "RSOLD CS" and 3 least significant bits (LSB's) from Table A to select which of the eight hardware elements of resources A, as defined above, to access.

Table A has twelve entries, one for each channel element. Each entry of Table A 3 includes 4 bits. The most significant bit (MSB) indicates whether the entry is for a RSOLD hardware element (MSB has a value of 0) or a RSNEW hardware element (MSB has a value of 1). The three LSB's contain the hardware element number when the MSB is 0.

Assuming that mapping for channel element "i" is requested, the $i^{th}$ entry of Table A is read and passed to a decoder 5 where it is decoded. If the MSB of the entry is 1, indicating a RSNEW hardware element, then the decoder causes the RSNEW chip select (CS) to be set, while the address is provided on the address bus. The three least significant bits of the entry of Table A, which indicate the hardware element number, are ignored if the MSB of the entry indicates a RSNEW hardware element. If the MSB of the entry of Table A has a value of 0, indicating a RSOLD channel element, the decoder 5 causes the RSOLD CS to be set to one and the three least significant bits LSB's of the $i^{th}$ entry of Table A, representing the hardware element number, to be output.

The resource allocator maps to and from RSBOTH shared hardware resources. Thus, the resource allocator must map up to, for example, eight users of RSOLD fixed hardware elements and up to a remaining number of users of RSNEW fixed hardware elements to, for example, a total of twelve RSBOTH shared hardware elements. Thus, an example of some of the possible mappings to twelve shared hardware elements are twelve RSNEW users and zero RSOLD users, or eight RSOLD users and four RSNEW users, or two RSOLD users and ten RSNEW users, or three RSOLD users and nine RSNEW users.

Figure 2:
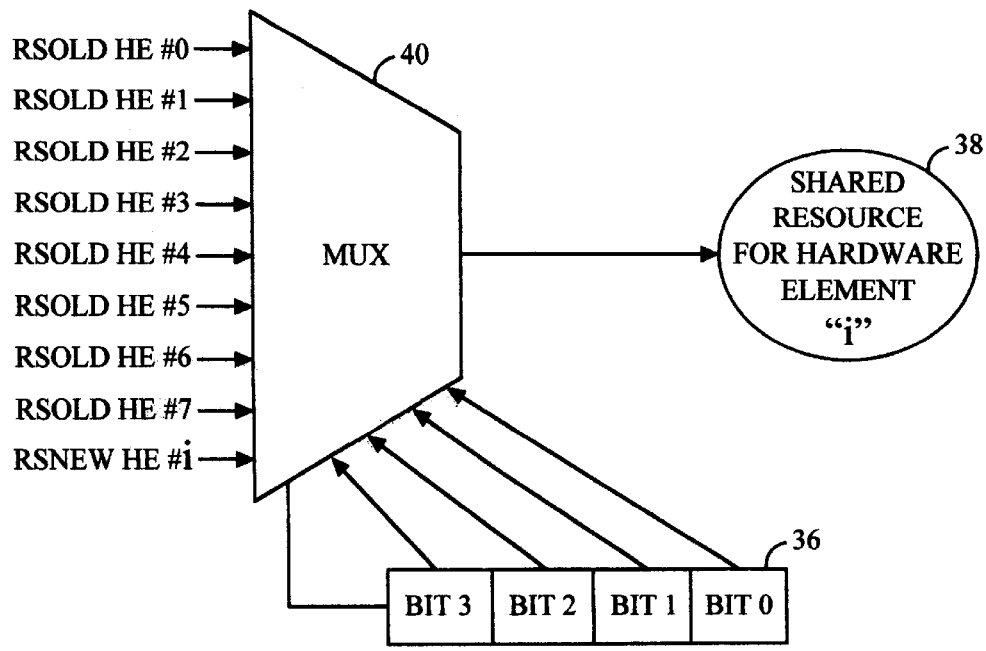
FIG. 2 shows an example of mapping fixed hardware resources to shared hardware resources.

FIG. 2 shows an example of connecting fixed hardware resources of types RSOLD and RSNEW to RSBOTH shared hardware resources. FIG. 2 shows a 9-to-1 multiplexer 40. Although, twelve 9-to-1 multiplexers are required for this embodiment, only one 9-to-1 multiplexer, the $i^{th}$ multiplexer, is shown in FIG. 2 for the sake of simplicity. Each 9-to-1 multiplexer is output to a different shared resource element. The 9-to-1 multiplexer 40 of FIG. 2 is output to the $i^{th}$ shared resource element 38. Signals from RSOLD hardware elements #0–7, respectively and from RSNEW hardware element #"i" are input to 9-to-1 multiplexer 40. Reference numeral 36 represents the $i^{th}$ entry of Table A. If bit 3 of entry 36 is a 1, indicating a RSNEW hardware element, then the signal from RSNEW hardware element #i is allowed to pass through the 9-to-1 multiplexer to shared hardware element i. If bit 3 of entry 36 of Table A is a 0, indicating an RSOLD hardware element, then the value of bits 0–2 of entry 36 determines which one of the signals from the RSOLD hardware elements will be allowed to pass through the 9-to-1 multiplexer 40 to shared resource hardware element 38.

Each 9-to-1 multiplexer receives inputs from RSOLD hardware elements #0–7. The first 9-to-1 multiplexer also receives an input from RSNEW hardware element #0, the second 9-to-1 multiplexer also receives an input from RSNEW hardware element #1, and so on. Each respective one of the 9-to-1 multiplexers has an output to a respective one of the RSBOTH shared resources.

Figure 3:
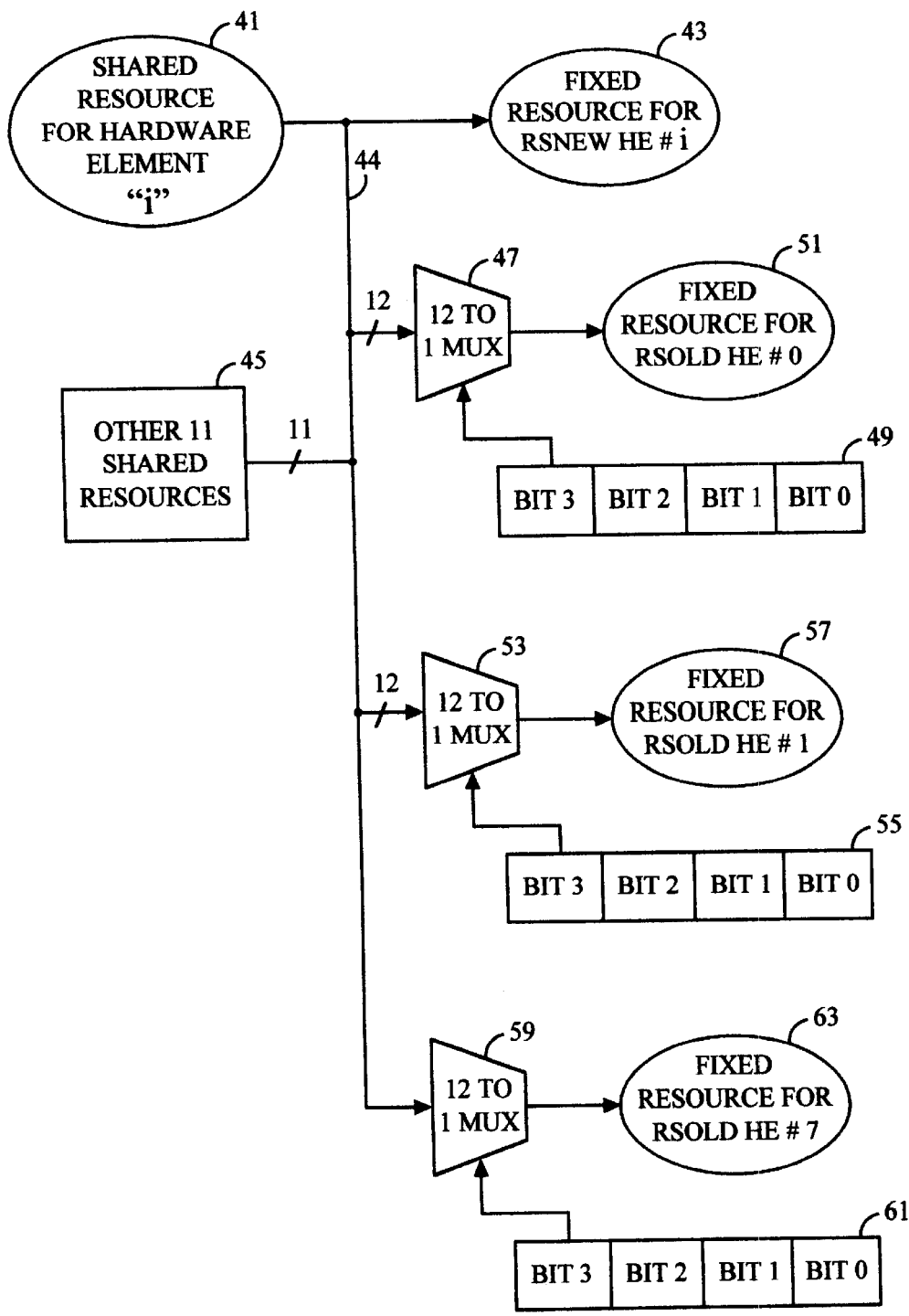
FIG. 3 shows an example of mapping shared hardware resources to fixed hardware resources.

FIG. 3 shows an example of mapping RSBOTH shared resources to RSOLD or RSNEW fixed resources. Reference numeral 41 refers to a shared resource for hardware element "i". Reference numeral 45 refers to the other 11 shared resources. In this example, the output of the other 11 shared resources 45 and the shared resource for hardware element "i" 41 are received as twelve inputs to eight 12-to-1 multiplexers. Only three of the 12-to-1 multiplexers 47, 53, 59 are shown. If a shared resource is mapped into a RSNEW fixed resource, the shared resource may be mapped directly to the RSNEW fixed resource. Thus, shared resources that are mapped to RSNEW hardware elements can be directly mapped to those elements.

Each of the 12-to-1 multiplexers 47, 53, 59 are similar to each other. Each 12-to-1 multiplexer 47, 53 and 59 receives inputs from each of the shared resources. Each of the 12-to-1 multiplexers 47, 53, 59 has an output directed to a unique one of the eight RSOLD hardware elements 51, 57, 63 (note that only 3 of the 8 RSOLD hardware elements are shown). Each of the 12-to-1 multiplexers 47, 53, 59 selects one of the twelve inputs based upon a value of a four-bit corresponding entry 49, 55, 61 in a Table B, which contains a total of eight entries, each of which may include a hardware ID, corresponding to the eight RSOLD hardware elements. For example, 49 refers to the first entry in Table B, 55 refers to the second entry in Table B, and 61 refers to the eighth entry in Table B (the third through seventh entries are not shown).

Figure 4:
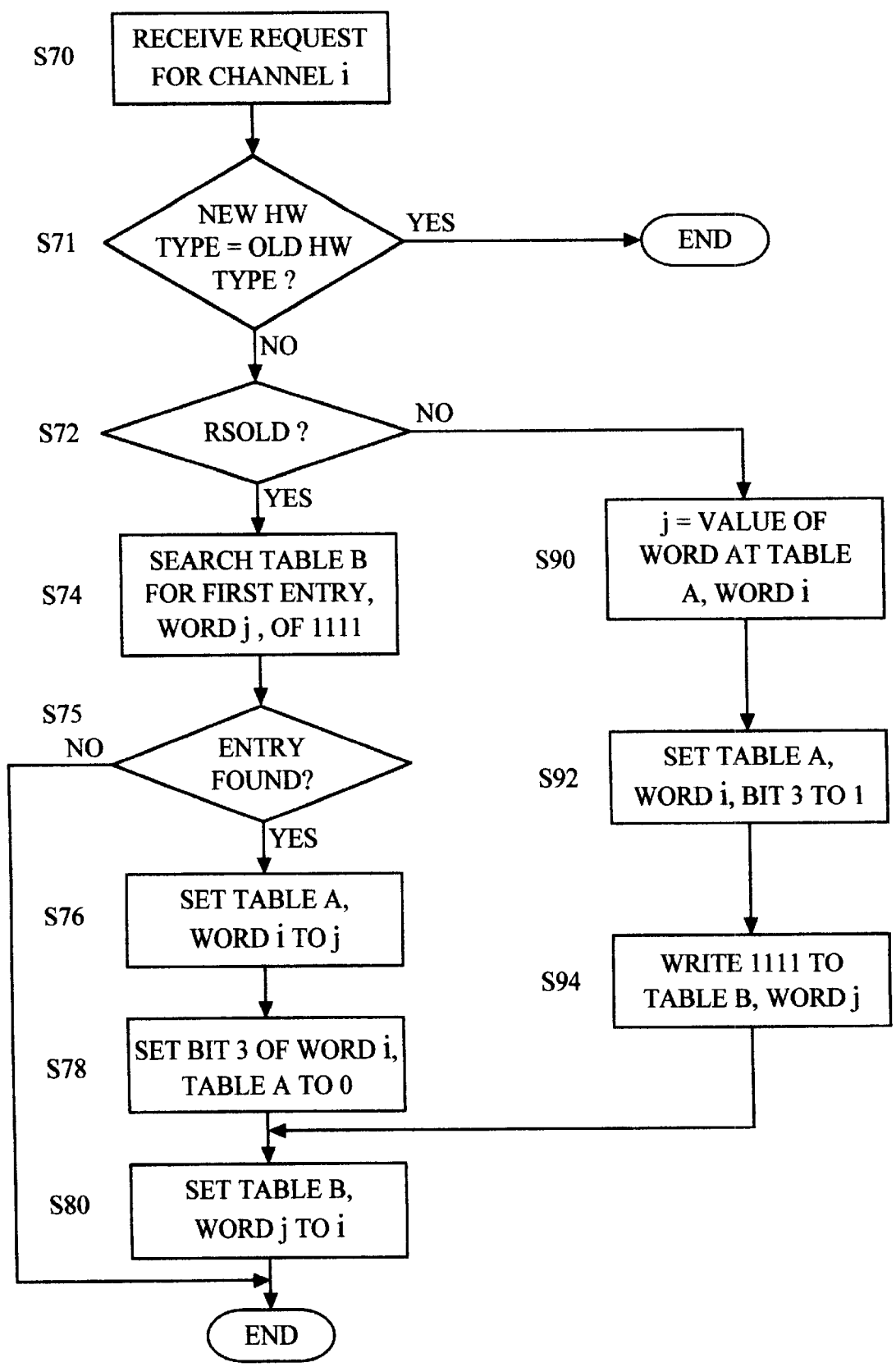
FIG. 4 is a flowchart which explains the process of allocating and deallocating an RSOLD hardware resource.

FIG. 4 is a flowchart which explains the process of allocating and deallocating a RSOLD channel or resource. In step S70, a request for channel "i" is made. The request indicates whether a RSOLD channel or a RSNEW channel is required. In step S71, a determination is made as to whether the new hardware type is the same as the old hardware type. For example, if channel "i" was previously used for RSOLD hardware, but is now requested for RSNEW hardware, or vice versa, then step S72 will be performed, otherwise the request will be ignored. In step S72, a determination is made as to whether the request is for an RSOLD channel or an RSNEW channel. If the request is for an RSOLD channel, step S74 is executed to search Table B for the first unused entry "j". An unused entry may be indicated by, for example, a value of binary 1111 in an entry of Table B. In step S75, a determination is made as to whether the search of step S74 was successful in finding an entry of 1111. If the search was not successful, the channel request is ignored and optionally a status bit is set accordingly. Otherwise, in step S76, Table A, word "i", the lower three bits are set to the value of the index "j", such that word "i" of Table A can be used to effectively point to word "j" of Table B. In step S78, word "i" of Table A is set to indicate an RSOLD channel. This can be done by, for example, setting bit 3 of word "i" to 0. In step S80, word "j" of Table B is set to "i", such that word "j" of Table B can be used to effectively point to word "i" of Table A.

If in step S72, it is determined that a RSNEW channel is requested for a previously allocated RSOLD channel, then step S90 will be executed to set index "j" to the value stored in, for example, bits 0–2 of word "i" of Table A. "j"0 indicates which one of the eight RSOLD hardware elements is associated with channel element "i". In step S92, Table A, word "i" is set to indicate an RSNEW channel. This may be accomplished by, for example, setting bit 3 of word i of Table A to 1. In step S94, a value is written into Table B, word "j", indicating that RSOLD hardware element "j" is deallocated. The value may be, for example, binary 1111.

Thus, a flexible hardware and software based solution is provided for mapping shared and fixed resources of more than one type.

While this invention has been described in connection with what is presently considered to be the preferred embodiment, it is to be understood that the invention is not limited to the disclosed embodiment, but on the contrary, is intended to cover various modifications and equivalent arrangements included within the spirit and scope of the appended claims.

What is claimed is:

1. A method of allocating and using up to a predetermined number of hardware resouces from among a plurality of types of hardware resources, said method comprising:

receiving a request for allocation of a shared hardware resource "i";

determining whether a requested hardware type is of a first hardware type;

performing following acts when said requested hardware type is of said first hardware type:

searching a first table in a memory of said allocator for a first unallocated entry "j";

setting an "$i^{th}$" entry in a second table of said memory of said allocator to a value corresponding to said first unallocated entry "j" of said first table;

setting said "$i^{th}$" entry in said second table of said memory of said allocator to indicate that said requested hardware type is of said first hardware type; and setting an entry in said first table, corresponding to said first unallocated entry "j", to a value corresponding to said "$i^{th}$" entry in said second table;

using a corresponding entry of said second table to select one of a plurality of inputs provided to one of a plurality of multiplexers; and outputting said selected one of said plurality of inputs from said one of said plurality of multiplexers.

2. A method according to claim 1 further comprising:

performing following acts when said requested hardware type is of a type other than said first hardware type:
setting said "$i^{th}$" entry in said second table of said memory of said allocator to indicate that said requested hardware type is of said type other than said first hardware type.

3. A method according to claim 2, further comprising:

allocating said previously allocated shared hardware resource "i", to a hardware resource being of a type other than said first hardware type, including:
determining that said hardware resource is of said type other than said first hardware type,
reading said "$i^{th}$" entry of said second table in order to obtain a value "k"; and setting a "$k^{th}$" entry of said first table to indicate that said "$k^{th}$" entry of said first table is unallocated.

4. A method according to claim 1, further comprising:

allocating said previously allocated shared hardware resource "i", to a hardware resource being of a type other than said first hardware type, including:
determining that said hardware resource is of said type other than said first hardware type;
reading said "$i^{th}$" entry of said second table in order to obtain a value "k"; and
setting a "$k^{th}$" entry of said first table to indicate that said "$k^{th}$" entry of said first table is unallocated.

5. A method of allocating and using up to a predetermined number of hardware resources from among a plurality of types of hardware resources, said method comprising:

receiving a request for allocation of a shared hardware resource "i";

determining whether a requested hardware type is of a first hardware type;

performing following acts when said requested hardware type is of said first hardware type:
searching a first table in a memory of said allocator for a first unallocated entry "j",
setting an "i" entry in a second table of said memory of said allocator to a value corresponding to said first unallocated entry "j" of said first table,
setting said "$i^{th}$" entry in said second table of said memory of said allocator to indicate that said requested hardware type is of said first hardware type, and
setting an entry in said first table, corresponding to said first unallocated entry "j", to a value indicating said "$i^{th}$" entry in said second table;
using a corresponding entry of said first table to select one of a plurality of inputs provided to one of a plurality of multiplexers, said plurality of inputs corresponding to signals from shared hardware resources of said first hardware type; and
outputting said selected one of said plurality of inputs from said one of said plurality of multiplexers.

6. A resource allocator for allocating and using up to a predetermined number of hardware resources from among a plurality of types of hardware resources, comprising:

means for receiving a request for allocation of a shared hardware resource "i";

means for determining whether a requested hardware type is of a first hardware type;

means for searching a first table in a memory of said allocator for a first unallocated entry "j";

means for setting an "$i^{th}$" entry in a second table of said memory of said allocator to a value corresponding to said first unallocated entry "j" of said first table;

means for setting said "$i^{th}$" entry in said second table of said memory of said allocator to indicate that said requested hardware type is of said first hardware type; and means for setting an entry in said first table, corresponding to said first unallocated entry "j", to a value indicating said entry in said second table;

means for using a corresponding entry of said second table to select one of a plurality of inputs provided to one of a plurality of multiplexers; and means for outputting said selected one of said plurality of inputs from said one of said plurality of multiplexers.

7. A resource allocator according to claim 6, further comprising:

means for setting said "$i^{th}$" entry in said memory of said allocator to indicate that said requested hardware type other than said first hardware type.

8. A resource allocator according to claim 6, further comprising:

means for allocating said previously allocated shared hardware resource "i", to a hardware resource being of a type other than said first hardware type, including:
means for determining that said hardware resource is of said type other than said first hardware type,
means for searching said first table for an entry having said value indicating said "$i^{th}$" entry of said second table,
means for setting said "$i^{th}$" entry of said second table to indicate said type other than said first hardware type, and
means the setting said entry of said first table having said value indicating said "$i^{th}$" entry of said second table to a value indicating deallocation.

9. A resource allocator for allocating and using up to a predetermined number of hardware resources from among a plurality of types of hardware resources, comprising:

means for receiving a request for allocation of a shared hardware resource "i";

means for determining whether a requested hardware type is of a first hardware type;

means for searching a first table in a memory of said allocator for a first unallocated entry "j";

means for setting an "$i^{th}$" entry in a second table of said memory of said allocator to a value corresponding to said first unallocated entry "j" of said first table;

means for setting said "$i^{th}$" entry in said second table of said memory of said allocator to indicate that said requested hardware type is of said first hardware type;

means for setting an entry in said first table, corresponding to said first unallocated entry "j", to a value indicating said "$i^{th}$" entry in said second table;

means for using a corresponding entry of said first table to select one of a plurality of inputs provided to one of a plurality of multiplexers, said plurality of inputs corresponding to signals from shared hardware resources of said first hardware type; and means for outputting said selected one of said plurality of inputs from said one of said plurality of multiplexers.

* * * * *